US000001258H

United States Statutory Invention Registration [19]

[11] Reg. Number: H1258

[43] Published: Dec. 7, 1993

Hindle, Jr.

[54] BLADE LOCK SCREW

[75] Inventor: Edmund H. Hindle, Jr., North Palm Beach, Fla.

[73] Assignee: The United States of America as represented by the Secretary of the Air Force, Washington, D.C.

[21] Appl. No.: 945,552

[22] Filed: Sep. 16, 1992

[51] Int. Cl.[5] ..... F01D 5/32

[52] U.S. Cl. ..... 416/215; 411/393; 411/418

[58] Field of Search ..... 416/215, 220 R, 221 R; 411/393, 403, 418

[56] References Cited

U.S. PATENT DOCUMENTS

| | | | |
|---|---|---|---|
| 1,075,710 | 10/1913 | Goodwin | 411/393 |
| 3,088,708 | 5/1963 | Feinberg | 416/215 |
| 3,955,898 | 5/1976 | Zaehring | 416/215 |
| 4,712,957 | 12/1987 | Edwards et al. | 411/418 |
| 4,859,149 | 8/1989 | McClain | 416/215 |

FOREIGN PATENT DOCUMENTS

| | | | |
|---|---|---|---|
| 2423690 | 11/1975 | Fed. Rep. of Germany | 416/215 |
| 2156908 | 10/1985 | United Kingdom | 416/215 |

OTHER PUBLICATIONS

Setko Set Screw catalog No. 19, Set Screw & Mfg. Co., Jun. 1956, front and back cover and p. 8.

*Primary Examiner*—David H. Brown

*Attorney, Agent, or Firm*—Thomas L. Kundert; Bobby D. Scearce

[57] ABSTRACT

This disclosure relates to the blade lock that serves to secure the blades to the drum rotor of a compressor in a gas turbine engine that is characterized by its ease of removal upon disassembly. The blade lock consists of two components, a locking member that engages the surface of a shoulder formed in the drum of the drum rotor and a screw threadably engaging a threaded central bore formed in the locking member having a platen engaging the bottom surface of the recess to urge the locking member to bear against the shoulder and where the screw carries three equally spaced longitudinal slots formed around the periphery of the threaded portion of the threads of the screw.

4 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

Fig. 5
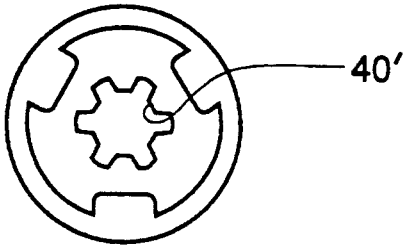
Fig. 4
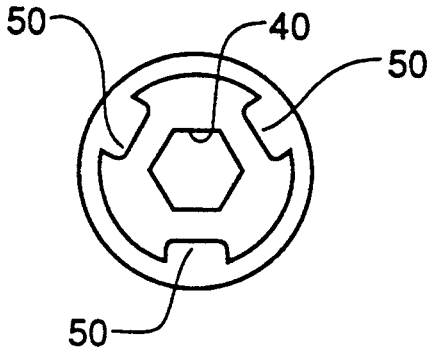
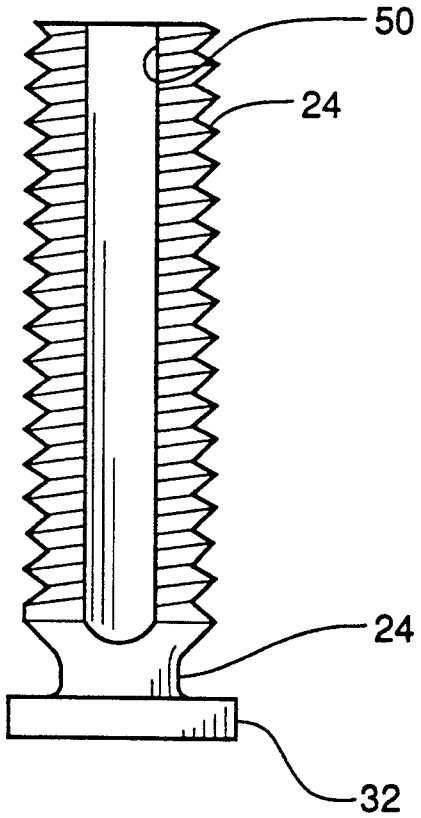
Fig. 3

BLADE LOCK SCREW

This invention was made under a U.S. Government contract and the Government has rights herein.

DESCRIPTION

1. Technical Field

This invention relates to compressor rotors for gas turbine engines and particularly to the means for securing the compressor blades to the drum of the drum rotor or rotor disk.

2. Background Art

The locking means for securing the blades to the drum rotor of the compressor of gas turbine engines has over time seized and as experienced it was virtually impossible to remove without having it drilled out. This had the propensity to cause damage to the drum rotor or rotor disk should there be an inadvertent slip of the drill bit or if the screw put up an inordinate amount of resistance to being removed.

An example of a blade locking assembly is disclosed in U.S. Pat. No. 3,721,506 granted to B. J. Anderson on Mar. 20, 1973 and entitled "Split-Nut Blade Lock Assembly". This patent discloses a blade lock which includes a split nut that threadably engages a set screw. In spite of the fact that the nut was split, it also had a tendency to seize over time and require extraordinary means for its removal.

U.S. Pat. No. 3,930,751 granted to W. A. Straslicka et al on Jan. 6, 1976 and entitled "Bucket Locking Mechanism" is another example of a blade locking device. This assembly includes locking means for a rotor that includes a plurality of blades supported to a rotor disk by fitting the blades in fir tree slots formed in the disk and utilizing a pin-set screw assembly to hold the blade in place.

There are a number of patents that show screws that are fabricated with axial slots extending the length of the threaded portion of the screw. U.S. Pat. No. 4,712,957 granted to W. Edwards et al on Dec. 15, 1987 and entitled "Adhesively Secured Fastener" exemplifies these types of devices. Typically, the side slots serve to allow the passage of adhesive to lock the crew in place or chips or metal slivers that are removed when screwing the screw in place.

This invention contemplates the combination of the slotted screw and a blade lock member that has proven to be capable of being removed without having to go through the extraordinary removal process heretofore required.

DISCLOSURE OF INVENTION

An object of this invention is to provided an improved blade lock for the blades of a drum rotor used in a gas turbine engine.

A feature of this invention is the slotted screw adapted to fit into a locking member to engage the bottom surface of the recess in the drum of the drum rotor to urge the locking member upwardly to bear against the surface of shoulders formed in the dovetail groove of the drum rotor or rotor disk to hold the blades in place where the slot is accessible at the top surface of the screw to allow admittance of lubricant to penetrate the threads for ease of removal.

The foregoing and other features of the present invention will become more apparent from the following description and accompanying drawings.

BRIEF DESCRIPTION OF DRAWINGS

FIG. 3 is a side elevation view of the slotted screw of this invention, FIG. 4 is a top view of the screw shown in FIG. 1 illustrating one type of tool receiving slot, and FIG. 5 is a top view illustrating another tool receiving slot.

BEST MODE FOR CARRYING OUT THE INVENTION

Figure 1:
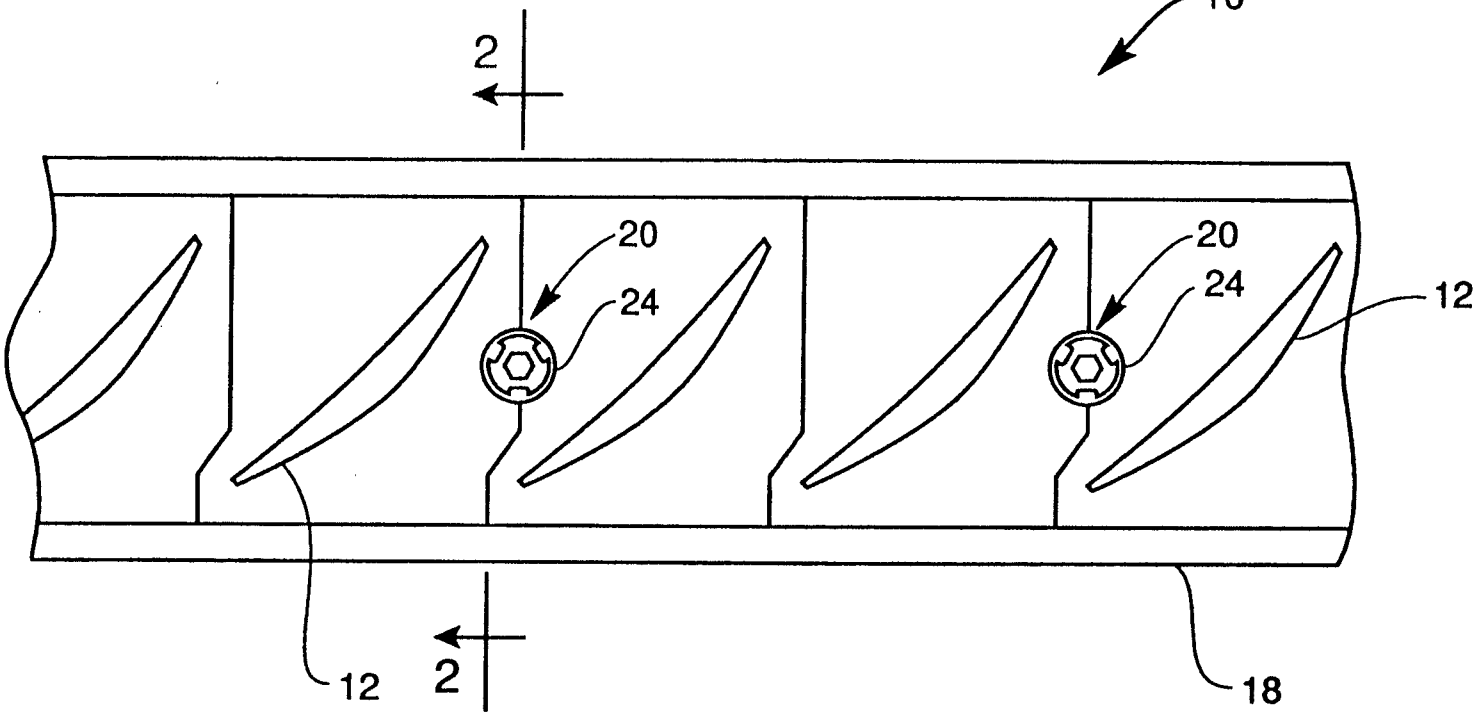
FIG. 1 is a developed partial view showing the top view of the assembled drum rotor of a gas turbine engine.
Figure 2:
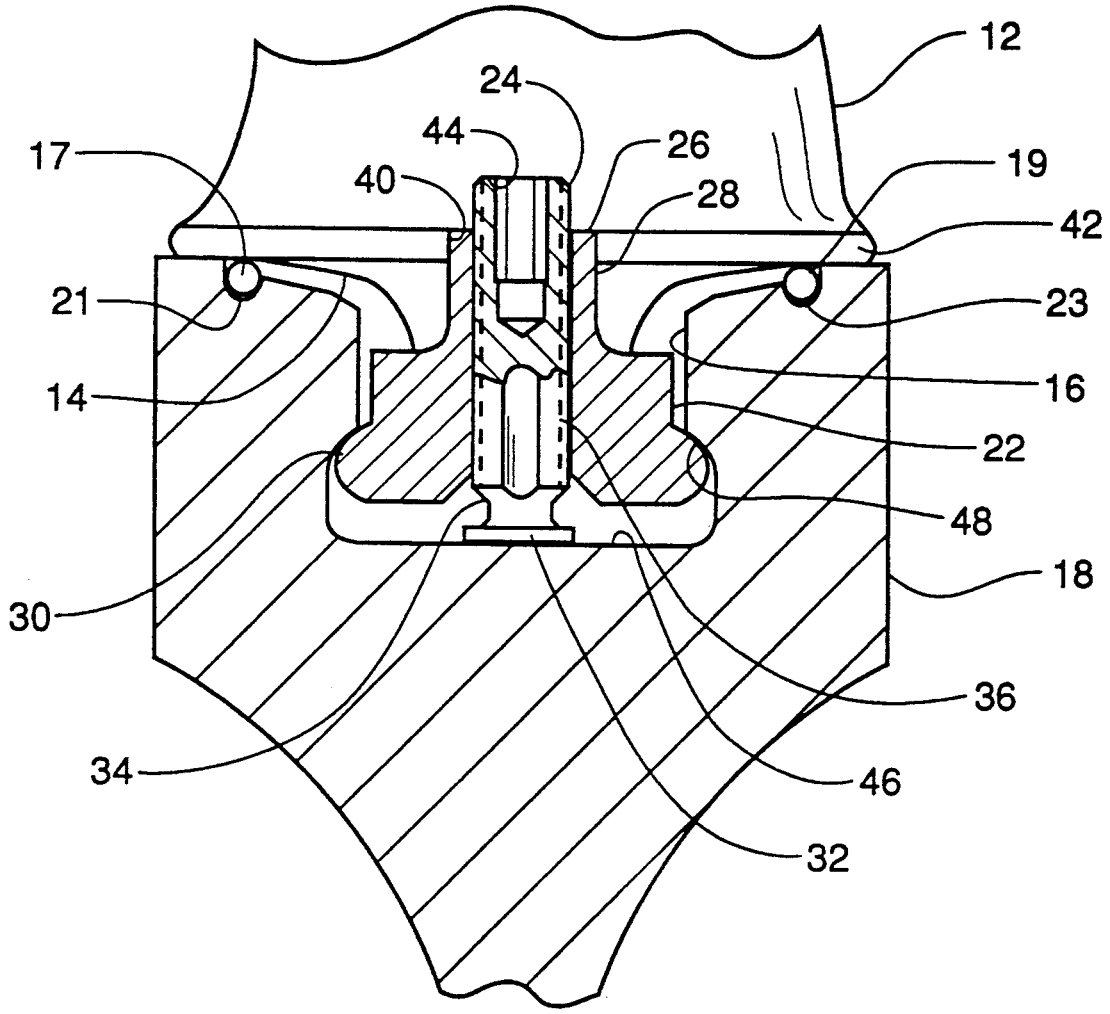
FIG. 2 is a sectional view taken along lines 2—2 of FIG. 1.

While this invention is described in its preferred embodiment of being used in a drum rotor for a gas turbine engine it will be appreciated by one skilled in this art that the invention has utility in other applications. The invention can best be understood by referring to FIGS. 1 and 2 which show a portion of a drum rotor as is typically used in a gas turbine engine generally indicated by reference numeral 10 supporting a row of axially flow compressor blades 12. As is typical in these types of installations the root section 14 of blades 12 are fitted into the circumferential dovetail slot 16 formed in the outer periphery of the drum 18. Once slid into position in the dovetail groove or slot 16, the blades are secured by snap rings 17 and 19 formed in circumferential slots 21 and 23, respectively. The blades then must be locked into place by means that are capable of withstanding the circumferential component of the aerodynamic loads developed during engine operation. The locking means must be capable of permitting the assembly and disassembly of blades with relative ease. As mentioned in the above experience has shown that heretofore locking means have seized over time requiring extraordinary measures for their removal with a consequential damage to the surrounding hardware.

According to this invention two locking means generally illustrated by reference numeral 20 serve to prevent circumferential movement of the blades 12 and secure them in place. The locking means includes a wedge member 22 and a set screw 24. Wedge member 22 is generally cylindrical in shape and includes a central threaded bore 26, a smaller diameter neck section 28 and a wider diameter locking section 30. The set screw 24 includes a platen 32, a smaller diameter neck section 34, and a threaded body 36. Installed, the locking means is fitted into the dovetail groove or slot 16 and the upper end of the neck section protrudes through drilled aperture 40 formed in the blade's platform 42. Set screw 24 includes a tool receiving recess 44 formed on the top surface remote from the platen 32 that can be made to accommodate existing Allen wrenches or can be splined (as shown as recess 40' in FIG. 5) if additional removing torque is required. To assemble the locking mechanism the locking member or wedge member is installed in the dovetail groove 16 and the set screw is installed to threadably engage the threads in the central bore 26. With the use of the tool, the set screw is torqued down so that the platen 32 bears against the surface 46 of the dovetail groove 16 and forces the wider diameter locking section 30 of wedge member 22 to engage the shoulder 48 formed in the drum 18. This serves to prevent the blades 12 from moving while being capable of withstanding the aerodynamic loads encountered during operation.

As noted and according to this invention the set screw 24 includes three equally spaced axial grooves 50 extending from the top surface to the neck 34. This serves to allow for the ease of removal during teardown after considerable operation time of the engine without the necessity of relying on extraordinary means for removal as has been experienced in the past. The axial slots 50 not only help in reducing torquing loads but also enhances thread cleaning capability and allows the penetration of lubrication fluids during teardown.

Although this invention has been shown and described with respect to detailed embodiments thereof, it will be appreciated and understood by those skilled in the art that various changes in form and detail thereof may be made without departing from the spirit and scope of the claimed invention.

What is claimed:

1. For a compressor of a gas turbine engine including a drum rotor having a circumferential dovetail groove for receiving a plurality of compressor blades each having a root portion, platforms adjacent said root portion of said blades, the side edges of said platforms abutting adjacent side edges of adjacent platforms, the improvement comprising:

means including a wedge member and a set screw having external threads engaging threads formed in a central bore in said wedge member, a land formed on a first end of the set screw having a surface engaging the bottom surface of said dovetail groove, a tool access recess formed on a second end of said set screw remote from said land, said set screw having at least one axial slot extending through said external threads from said land to said second end on the side of said set screw, an enlarged diameter portion on said wedge member ficitionally engaging a side surface of said dovetail groove to lock said blades into position in said dovetail groove, and an opening in at least one of said side edges of said adjacent platforms affording access to said tool receiving recess to torque down said set screw and force said wedge member in engagement with said side surface.

2. For a compressor of a gas turbine engine as claimed in claim 1 wherein said set screw includes a reduced diameter neck section disposed between said land and said threads and includes three equally spaced axially extending slots extending from the top of said screw to said neck whereby lubricant can be admitted to said threads.

3. For a compressor as claimed in claim 2 wherein said recess is splined to accommodate a splined shaped tool.

4. For a compressor as claimed in claim 2 wherein the opening in at least one of said side edges of adjacent platforms is disposed centrally between adjacent platforms.

* * * * *